UNITED STATES PATENT OFFICE.

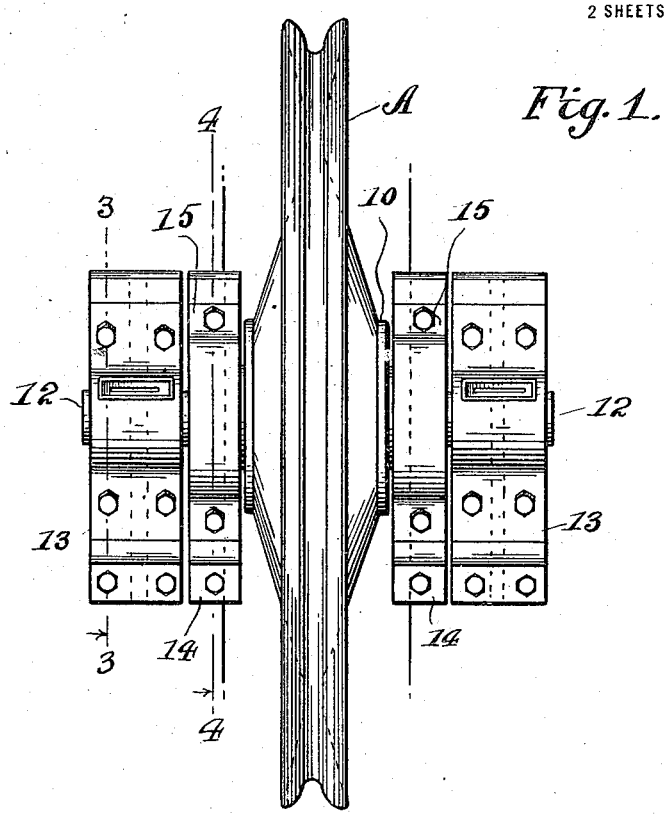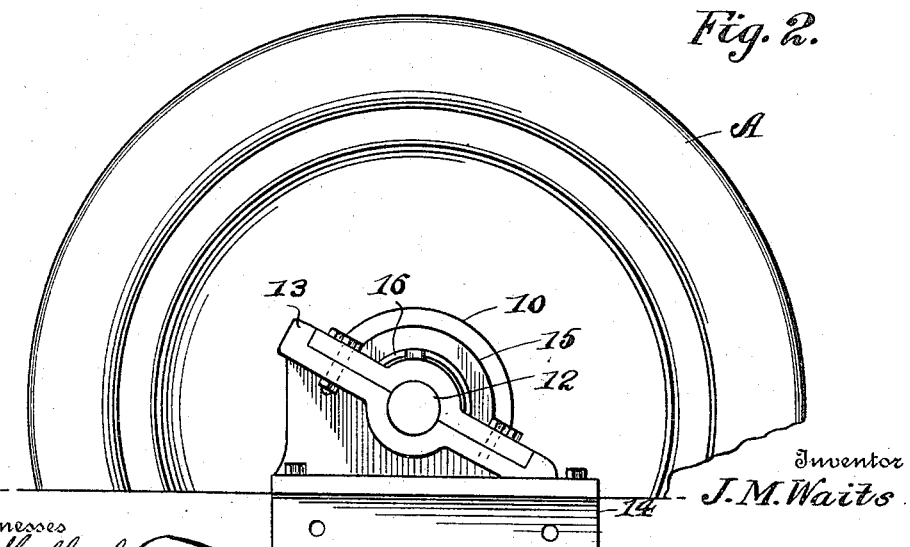

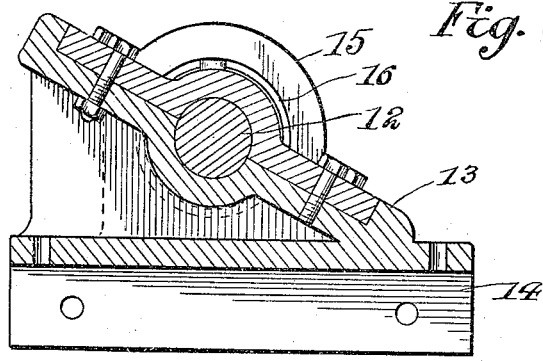
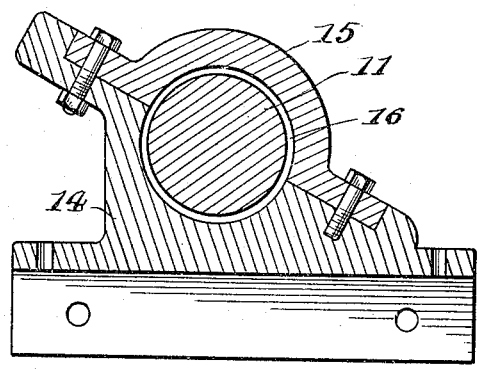
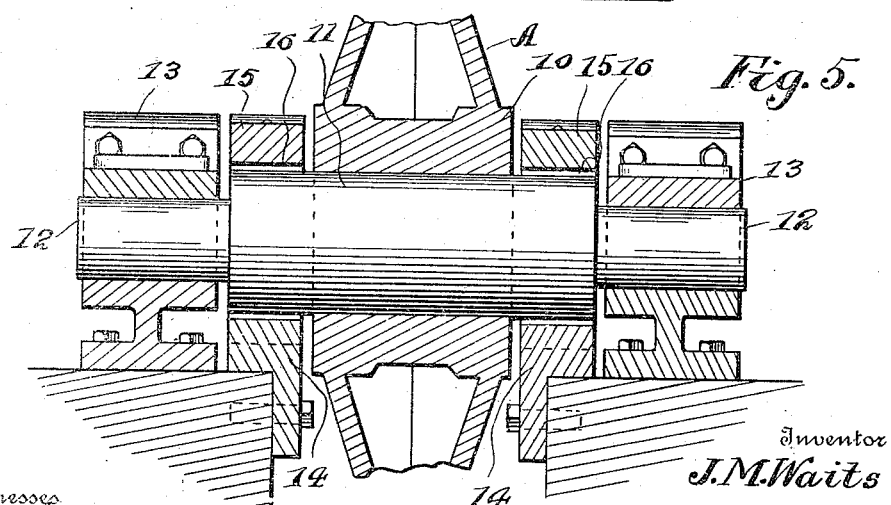

JOHN MADISON WAITS, OF ELDORADO, ILLINOIS.

PULLEY OR SHEAVE JOURNAL AND MOUNT.

1,204,094.  Specification of Letters Patent.  Patented Nov. 7, 1916.

Application filed February 18, 1916. Serial No. 79,170.

*To all whom it may concern:*

Be it known that I, JOHN M. WAITS, a citizen of the United States, residing at Eldorado, in the county of Saline and State of Illinois, have invented new and useful Improvements in Pulley or Sheave Journals and Mounts, of which the following is a specification.

The invention relates to pulley or sheave journals and mounts, and more particularly to the class of pulley wheel or sheave bearings and axles therefor.

The primary object of the invention is the provision of a structure of this character wherein the journal for the pulley wheel or sheave is of novel construction and is mounted in bearings so that in event of the breaking of the journal the same will not come loose for the displacement of the pulley wheel or sheave.

Another object of the invention is the provision of a structure of this character wherein the journal of the pulley wheel or sheave is held in emergency bearings so as to assure safety, the structure being designed particularly for use in mines for the hauling of coal, laborers and animals in elevator shafts, although the structure is adaptable for any other use to prevent accidents or the loss of life by the breaking of the journal and the working loose thereof from the bearings.

A further object of the invention is the provision of a structure of this character which is extremely simple in construction, thoroughly reliable and efficient in operation, strong, durable and inexpensive of manufacture.

Other objects will be in part obvious and in part hereinafter pointed out.

The invention accordingly consists in the features of construction, combination of elements and arrangement of parts which will be exemplified in the construction hereinafter described, and the scope of the application of which will be indicated in the appended claims.

In the drawings: Figure 1 is a top plan view of a pulley wheel or sheave showing the mounting therefor constructed in accordance with the invention; Fig. 2 is a side elevation; Fig. 3 is a sectional view on the line 3—3 of Fig. 1; Fig. 4 is a sectional view on the line 4—4 of Fig. 1; Fig. 5 is a vertical sectional elevation longitudinally through the journal when mounted in the bearing.

Similar reference characters indicate corresponding parts throughout the several views of the drawings.

Referring to the drawings in detail, A designates generally a pulley wheel or sheave having the center hub 10, which is mounted upon an axle 11 formed with reduced ends 12, the larger cross sectional diameter of the axle 11 being of considerably greater width than the hub 10 for a purpose presently described.

The axle 11 has its reduced ends 12 rotatably mounted in two-part axle boxes which, in this instance, are in the form of angular pedestals 13 and constitute a main bearing for the said axle.

Arranged between the bearings 13 are two-part emergency bearings, each comprising a base section 14 and a top section 15, respectively, which embrace the larger portion of the axle 11 protruding beyond opposite sides of the hub 10, and the openings 16 formed by the two-part sections 14 and 15 of the emergency bearing are of slightly greater size than the cross sectional diameter of the larger portion of the axle 11, so that normally the said axle 11 will not frictionally wear upon the auxiliary or emergency bearing, but in the event of the breaking of either or both of the reduced ends 12 of the said axle 11 the emergency bearing will hold the larger portion of the axle 11 in place and rotatably support the same so that there will be no possibility of displacement of the pulley wheel or sheave, thereby avoiding the working loose of the same, which would result in injury to life or damage to property when the pulley wheel and sheave, together with the bearings, are mounted for use.

The pulley wheel or sheave A is used in the ordinary manner for the rope or cable runs in hoisting apparatus for haulage purposes.

From the foregoing description, taken in connection with the accompanying drawings, the construction and manner of operation of my invention will be readily apparent and, therefore, a more extended explanation has been omitted.

Having thus described my invention, I claim:

1. The combination with a pulley wheel having a hub, of an axle passed through the hub and having different cross sectional diameters, the larger diameter being extended beyond opposite sides of the hub; bearings receiving the smaller diameter of the axle, and auxiliary bearings receiving the larger diameter of the axle beyond opposite ends of the hub.

2. The combination with a pulley wheel having a hub, of an axle passed through the hub and having different cross sectional diameters, the larger diameter being extended beyond opposite sides of the hub, bearings receiving the smaller diameter of the axle, auxiliary bearings receiving the larger diameter of the axle beyond opposite ends of the hub, each of the said bearings being formed in a plurality of separable sections.

In testimony whereof I affix my signature in presence of two witnesses.

JOHN MADISON WAITS.

Witnesses:
SCOTT STONE,
JOE VANDYGRAPH.

Copies of this patent may be obtained for five cents each, by addressing the "Commissioner of Patents, Washington, D. C."